United States Patent [19]

Mimura

[11] Patent Number: 5,094,333

[45] Date of Patent: Mar. 10, 1992

[54] CURRENT CONTROL DEVICE FOR AN AUTOMOTIVE ELECTROMAGNETIC CLUTCH

[75] Inventor: Munehiko Mimura, Himeji, Japan

[73] Assignee: Mitsubishi Denki K.K., Tokyo, Japan

[21] Appl. No.: 651,082

[22] Filed: Feb. 6, 1991

[30] Foreign Application Priority Data

Feb. 7, 1990 [JP] Japan .................................. 2-29133
Feb. 13, 1990 [JP] Japan .................................. 2-32802

[51] Int. Cl.$^5$ ...................... F16D 27/00; B60K 41/02; G05F 1/56
[52] U.S. Cl. ............................. 192/84 R; 192/0.075; 192/0.096; 361/152; 323/282; 323/284
[58] Field of Search ............... 192/0.075, 0.096, 84 R; 361/152, 154, 205; 323/282, 283, 284, 351

[56] References Cited

U.S. PATENT DOCUMENTS

| | | | |
|---|---|---|---|
| 4,242,629 | 12/1980 | Shuey | 323/282 X |
| 4,499,412 | 2/1985 | Locher et al. | 361/152 X |
| 4,515,257 | 5/1985 | Takano et al. | 192/0.096 X |
| 4,520,909 | 6/1985 | Brewer | 192/0.096 X |
| 4,521,726 | 6/1985 | Buonik | 323/284 X |
| 4,615,425 | 10/1986 | Kobayashi et al. | 192/0.096 X |
| 4,620,624 | 11/1986 | Mitsui et al. | 192/0.096 X |
| 4,660,699 | 4/1987 | Sakakiyama | 192/0.075 |
| 4,662,496 | 5/1987 | Sakakiyama | 192/0.075 X |
| 4,674,610 | 6/1987 | Sakakiyama | 192/0.075 X |
| 4,922,160 | 5/1990 | Ogawa | 301/152 X |

FOREIGN PATENT DOCUMENTS

| | | | |
|---|---|---|---|
| 57-51530 | 3/1982 | Japan . | |
| 62-31533 | 2/1987 | Japan . | |
| 62-93525 | 4/1987 | Japan | 192/0.075 |
| 2135483 | 8/1984 | United Kingdom . | |

Primary Examiner—Leslie A. Braun
Assistant Examiner—Nicholas Whitevan
Attorney, Agent, or Firm—Sughrue, Mion, Zinn, Macpeak & Seas

[57] ABSTRACT

A current control device for an automotive electromagnetic clutch includes a first and a second transistor 8 and 13 and a current detector resistor 14, which are coupled in series with the electromagnetic clutch 4. A PWM modulator 7 controls the ON/OFF of the first transistor to control the amount of excitation current flowing through the electromagnetic clutch. The second transistor turns off the excitation current in response to the disconnection signal SO for the electromagnetic clutch. The current detector 6 detects the current flowing through the resistor 14, and the amount of current through the electromagnetic clutch is controlled to a target valve via the calculation means 2, the deviation amplifier 5, and the PWM modulator 7. The error in current detection due to the current flowing through the reverse excitation resistor 12 is eliminated by the insertion of a transistor 17 controlled in response to the clutch disconnection signal SO by a transistor 19 (FIG. 2). Alternatively, the effect of the base current to the current detection is eliminated by an adoption of a second transistor 70 of the field effect type (FIG. 3).

4 Claims, 3 Drawing Sheets

CURRENT CONTROL DEVICE FOR AN AUTOMOTIVE ELECTROMAGNETIC CLUTCH

BACKGROUND OF THE INVENTION

This invention relates to excitation current control devices for automotive electromagnetic clutches, which control the torque transmission of automotive electromagnetic clutches.

FIG. 1 is a circuit diagram of a conventional automotive electromagnetic clutch current control device. The automotive electromagnetic clutch current control device, comprising electromagnetic clutch current calculation means 2 and supplied power from a current source 3, controls the excitation current supplied to an electromagnetic clutch 4 having an excitation coil 41 and a pair of contacts 42 and 43. The electromagnetic clutch current calculation means 2, including an interface 21 and a microcomputer 22, calculates, from the running state control information $S_D$ and engine control information $S_E$, digital instruction signal $S_{ID}$ for the electromagnetic clutch excitation current. A D/A converter DA then obtains an analog instruction signal $S_{IA}$ for the electromagnetic clutch current. A current deviation amplifier 5 obtains a deviation of the electromagnetic clutch current feedback signal $S_F$ of a current detector amplifier 6 with respect to the analog instruction signal $S_{IA}$. In response to the deviation signal from the deviation amplifier 5, a PWM (pulse width modulation) modulator 7 controls the ON-OFF operation of a first output transistor 8 for controlling the current supplied to the electromagnetic clutch 4. A reflux diode 9 and a quick-break diode 11 are coupled in series with the electromagnetic clutch 4 via output terminals T1 and T2 of the automotive electromagnetic clutch current control device 1. Further, reverse excitation resistors 10 and 12 are coupled in series with the electromagnetic clutch 4 via the terminals T1 and T2 across a voltage source T3 and ground. A second output transistor 13, the emitter of which is coupled to a current detector resistor 14 and the base of which is coupled to the voltage source T3 via a base resistor 15, is always in the ON state during the time when the electromagnetic clutch 4 is in the connected state in usual operation. The second output transistor 13 is turned off in response to an electromagnetic clutch open or disconnection signal SO inputted to the base of a transistor 16 from the excitation current calculation means 2. The current detector 6, comprising an operational amplifier 61 and resistors 62 and 63, detects the voltage across the current detector resistor 14 corresponding to the excitation current through the electromagnetic clutch 4. When both the output transistors 8 and 13 are turned off, a reverse excitation current flowing in the direction opposite to that of the (normal) excitation current $i_c$ is supplied to the electromagnetic clutch 4 from the source T3 via the reverse excitation resistors 10 and 12. The reverse excitation current is necessary for compensating for and eliminating the residual torque.

As described above, the voltage across the current detector resistor 14 (which corresponds to the current flowing therethrough) is detected by the current detector amplifier 6 for the purpose of detecting the excitation current flowing through the electromagnetic clutch 4. The automotive electromagnetic clutch excitation current control device of FIG. 1 has therefore the following disadvantage.

When the output transistor 13 is being turned on, the base current $I_B$ of the transistor 13 flows through the current detector resistor 14 in addition to the excitation current $i_c$ flowing through the electromagnetic clutch 4. Further, the current $I_C$ flowing through the reverse excitation resistor 12 also flows through the current detector resistor 14. Thus, the current $I_E$ through the current detector resistor 14 is given by:

$$I_E = I_C + I_B + i_c$$

Thus, the detected electromagnetic clutch current $I_E$ includes, in addition to the actual electromagnetic clutch current $i_c$, an error $\Delta I\epsilon$ equal to:

$$I_C + I_B.$$

For example, when $I_C=0.2$ amperes, $I_B=0.1$ amperes, and $i_c=4.0$ amperes, then, $I_E$ is equal to 4.3 amperes, which thus includes an error of 7.5%. Thus, precise control of the electromagnetic clutch excitation current becomes impossible. In particular, the control of a small torque in the small current region cannot be effected with sufficient precision.

The error component due to the reverse current $I_C$, however, may sometimes by corrected via the current detector amplifier 6. Even then, an error component due to the base current $I_B$ remains. Where $I_C-0.1$ amperes, $I_B=0.2$ amperes, and $i_c-4.0$ amperes, such that $I_E=4.3$ amperes, the base current $I_B$ of the second transistor 13 generates an error of 5%. Thus, precise control of the electromagnetic clutch excitation current becomes impossible.

SUMMARY OF THE INVENTION

Thus, a primary object of this invention is to provide an automotive electromagnetic clutch current control device which is capable of detecting the electromagnetic clutch current precisely and thus is capable of controlling the electromagnetic clutch with enhanced precision and reliability, especially in the small torque region.

The above object is accomplished in accordance with the principle of this invention by a control device for controlling a current flowing through an automotive electromagnetic clutch coupled to a current source, comprising: a first transistor coupled in series with said electromagnetic clutch for controlling an amount of excitation current through said electromagnetic clutch; a second transistor coupled in series with said electromagnetic clutch and said first transistor, for interrupting said excitation current in response to a signal for disconnecting said electromagnetic clutch; a current detector resistor connected in series with said electromagnetic clutch; current detector means for detecting current flowing through said current detector resistor; control means for controlling excitation current through said electromagnetic clutch to a target value thereof in response to the detection signal of said current detector; a reverse excitation current resistor coupled across a current source and said electromagnetic clutch for supplying a reverse excitation current to said electromagnetic clutch; and a third transistor inserted between the current source and the reverse excitation current resistor, said third transistor being turned off in response to said signal for disconnecting the electromagnetic clutch.

Alternatively, the second transistor may be made of a field effect transistor so as to eliminate the excitation current detection error due to the base current thereof.

BRIEF DESCRIPTION OF THE DRAWINGS

The features which are believed to be characteristic of this invention are set forth in the appended claims. This invention itself, however, may best be understood from the detailed description of the preferred embodiments, taken in connection with the drawings, in which:

In the drawings, like reference numerals represent like or corresponding parts.

DETAILED DESCRIPTION OF THE PREFERRED EMBODIMENTS

Figure 2:
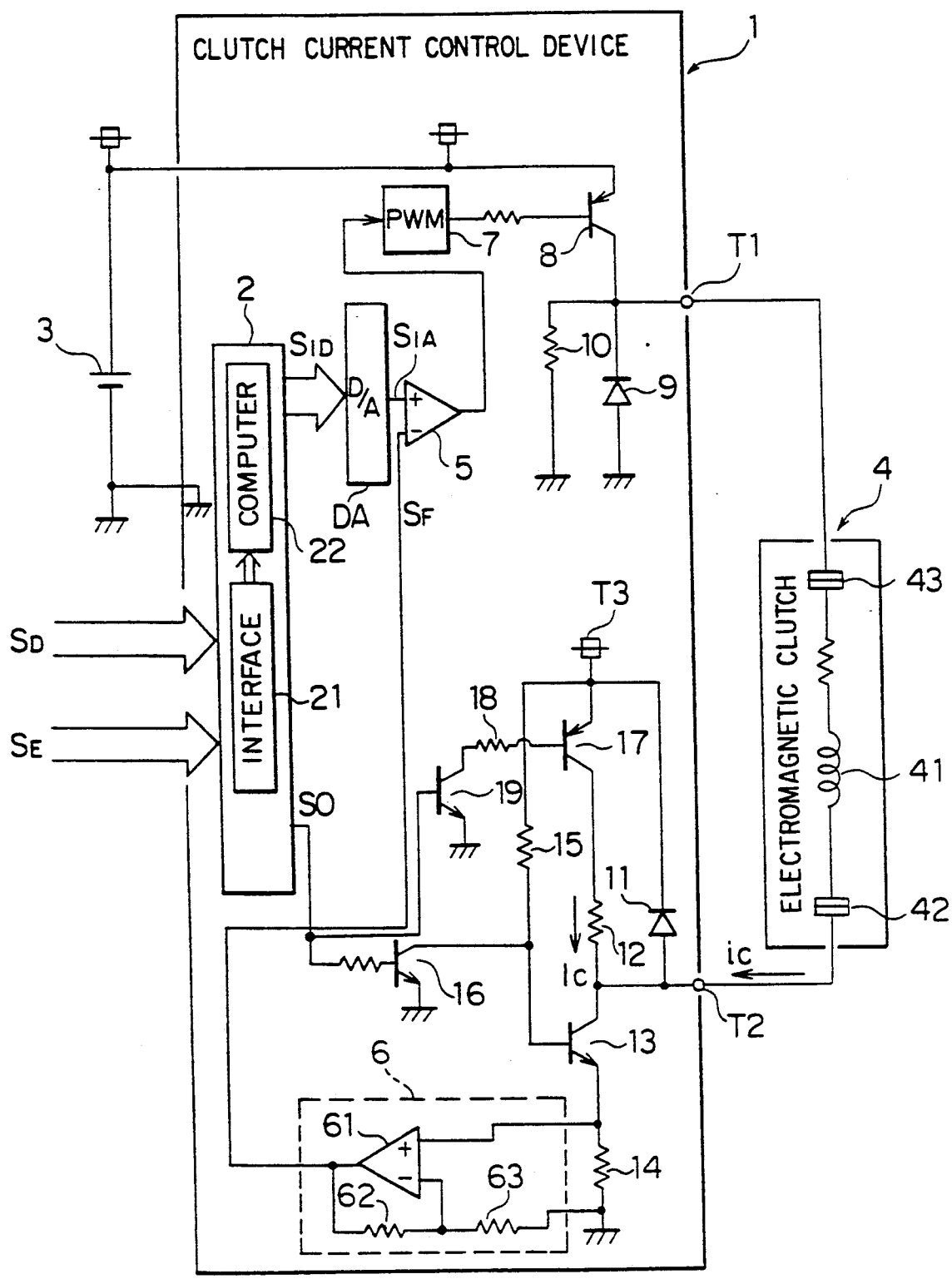
FIG. 2 is a circuit diagram of an electromagnetic clutch current control device according to an embodiment of this invention.

Referring now to FIG. 2 of the drawings, a first embodiment of this invention is described.

Figure 1:
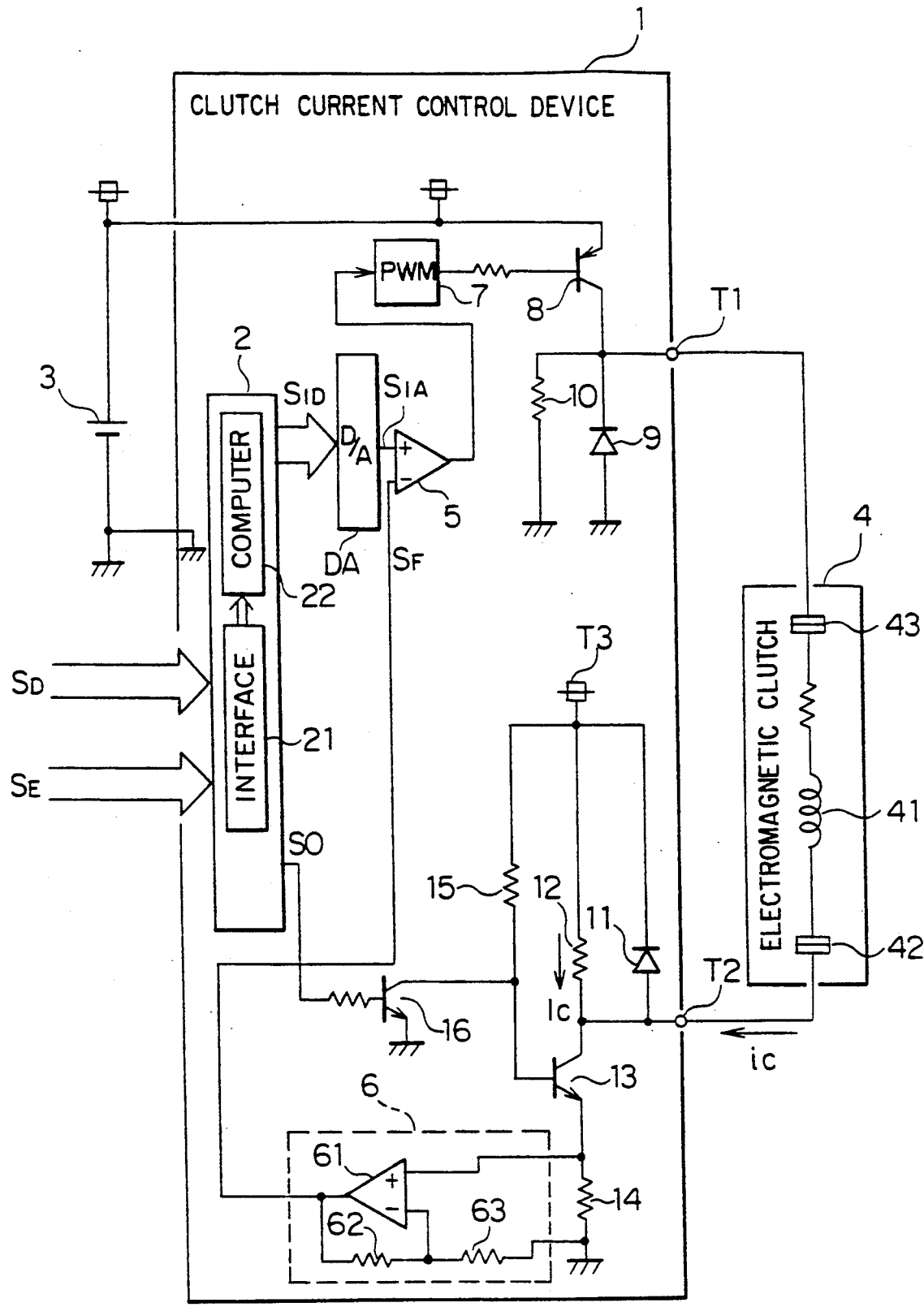
FIG. 1 is a circuit diagram showing a typical organization of an electromagnetic clutch current control device.

The organization and method of operation of the automotive electromagnetic clutch current control device of FIG. 2 is similar to those of the device of FIG. 1, except for the insertion of a transistor 17 between the current source T3 and the resistor 12 supplying the reverse excitation current to the electromagnetic clutch 4. The base of the transistor 17 is coupled to the collector of another transistor 19 which controls the ON/OFF of the transistor 17 in response to the clutch disconnection or open signal SO generated by the calculation means 2. The electromagnetic clutch 4 is disconnected when the parking or the neutral range is selected. Under such circumstance, the clutch disconnection or open signal SO is outputted from the electromagnetic clutch current calculation means 2. In response thereto, the transistor 19 is turned on, thereby turning on the transistor 17 by grounding the base thereof via the base resistor 18. Thus, reverse excitation current $I_C$ is supplied from the source T3 to the electromagnetic clutch 4 via the transistor 17 and the resistors 10 and 12.

When, on the other hand, the electromagnetic clutch is connected and the signal SO is not outputted, the transistor 19 is turned off, and hence the transistor 17 is also turned off. Thus, no current flows through the resistor 12 to produce an error in the excitation current detection.

For example, when $I_C=0$ A, $I_B=0.1$ A, $i_c=4.0$ A, the current $I_E$ is: $I_E=4.1$ A. Thus, the contribution of the reverse excitation resistor current $I_C$ to the electromagnetic clutch current detection error is eliminated, and only the error of 2.5% due to the base current $I_B$ remains. This error may be removed by means of the resistors 62 and 63 of the current detector 6.

Thus, the output of the current detector 6 exactly corresponds to the current flowing through the electromagnetic clutch. The PWM modulator 7 controls the amount of the excitation current through the electromagnetic clutch 4 by turning on and off the transistor 8. This control is effected in such a manner that the output of the deviation amplifier 5 is minimized. Thus, the excitation current through the electromagnetic clutch 4 is controlled to the precise target level exactly corresponding to the running state control information $S_D$ and the engine control information $S_E$ in response to which the calculation means 2 calculates the digital instruction value $S_{ID}$.

Figure 3:
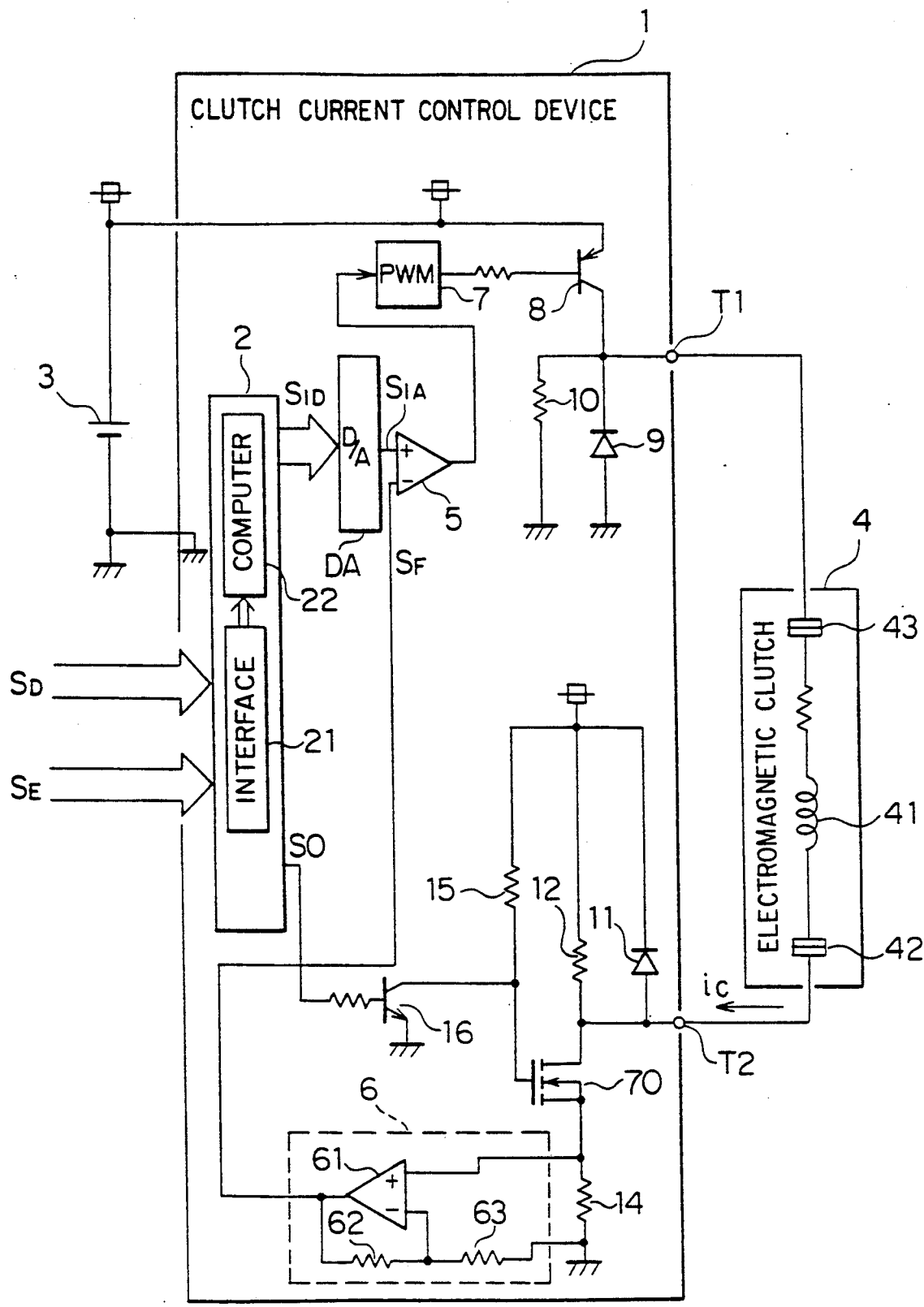
FIG. 3 is a circuit diagram of an electromagnetic clutch current control device according to another embodiment of this invention.

FIG. 3 shows an electromagnetic clutch current control device according to a second embodiment of this invention. This control device is also similar to that of FIG. 1, except that the second transistor 70 is a field effect transistor instead being a transistor of the bipolar type of FIG. 1. The magnitude of current which flows from the gate to the source of the field effect transistor 70 is negligible. Thus, the adverse effect of the second output transistor 70 to the detection of the electromagnetic clutch current is eliminated. For example, when $I_C=0.1$ A and $i_c=4.0$ A, then the detected current is: $I_E=4.1$ A, the base current being negligible: $I_B=0$ A. Thus, the error due to the base current $I_B$ is eliminated and only the error 2.5% due to the reverse excitation current resistor 12 remains. This error may be removed by means of the resistors 62 and 63 of the current detector 6. Thus, precise control of the electromagnetic clutch 4 is realized even in the small current range.

What is claimed is:

1. A control device for controlling a current flowing through an automotive electromagnetic clutch coupled to a current source, comprising:
   a first transistor coupled in series with said electromagnetic clutch for controlling an amount of excitation current through said electromagnetic clutch;
   a second transistor coupled in series with said electromagnetic clutch and said first transistor, for interrupting said excitation current in response to a first signal for disconnecting said electromagnetic clutch;
   a current detector resistor connected in series with said electromagnetic clutch;
   current detector means for detecting current flowing through said current detector resistor;
   control means for controlling excitation current through said electromagnetic clutch to a target value thereof in response to the detection signal of said current detector;
   a reverse excitation current resistor coupled across a current source and said electromagnetic clutch for supplying a reverse excitation current to said electromagnetic clutch;
   a third transistor inserted between the current source and the reverse excitation current resistor, said third transistor being turned off in response to a second signal for disconnecting the electromagnetic clutch; and
   means responsive to an output of said control means for producing said first and second signals to oppositely bias said second and third transistors, such that when said electromagnetic clutch is connected, said third transistor is turned off and said first and second transistors control the flow of excitation current through said electromagnetic clutch, and when said electromagnetic clutch is disconnected, said first and second transistors are turned off and the on/off operation of said third transistor controls the flow of excitation current through said electromagnetic clutch.

2. A control device as claimed in claim 1, wherein said control means comprises:

calculation means for calculating a target value of said excitation current in accordance with running and engine state information of an automobile;

deviation detector means, coupled to said calculation means and said current detector means, for detecting and outputting a deviation, with respect to said target value, of the current detected by said current detector means; and pulse width modulation circuit means for controlling said first transistor in response to said deviation detected by said deviation detector means so as to minimize said deviation.

3. A control device for controlling a current flowing through an automotive electromagnetic clutch coupled to a current source, comprising:

a first transistor coupled in series with said electromagnetic clutch for controlling an amount of excitation current through said electromagnetic clutch;

a second transistor coupled in series with said electromagnetic clutch and said first transistor, for interrupting said excitation current in response to a signal for disconnecting said electromagnetic clutch, wherein said second transistor is a field effect transistor;

a current detector resistor connected in series with said electromagnetic clutch;

current detector means for detecting current flowing through said current detector resistor; and control means for controlling excitation current through said electromagnetic clutch to a target value thereof in response to the detection signal of said current detector means.

4. A control device as claimed in claim 3, wherein said control means comprises:

calculation means for calculating a target value of said excitation current in accordance with running and engine state information of an automobile;

deviation detector means, coupled to said calculation means and said current detector means, for detecting and outputting a deviation, with respect to said target value, of the current detected by said current detector means; and pulse width modulation means for controlling said first transistor in response to said deviation detected by said deviation detector means so as to minimize said deviation.

* * * * *